July 5, 1960           H. E. KADEN           2,943,757

MULTI-GANG SWITCH BOX

Filed Oct. 26, 1959

INVENTOR.
HARRY E. KADEN
BY
Sanford Schnurmacher
ATTORNEY.

United States Patent Office 2,943,757
Patented July 5, 1960

2,943,757

MULTI-GANG SWITCH BOX

Harry E. Kaden, 3247 Cedar Brook Road, Cleveland Heights, Ohio

Filed Oct. 26, 1959, Ser. No. 848,814

2 Claims. (Cl. 220—3.9)

This invention relates to switch boxes and particularly to a two-gang switch box.

Conducive to a better understanding of the invention, it may be well to point out that in the construction of conventional buildings the walls and partitions are commonly fabricated by building a frame of spaced studs which are then covered with suitable sheet materials such as boards, plywood, or plaster, to form the finish wall or partition.

It is customary to conceal the electrical wiring for the lighting and operation of electrical appliances of such structures within the hollow space in the walls, between the studs. Switches to control such electrical systems are required to be housed in metal switch boxes which comprise a hollow metal shell open to the front. The box is usually mounted on one of the studs forming the wall frame, with its open face flush with the surface of the finished wall, so that the switch plate which covers the mounted switch will lie against the wall, concealing the switch box opening.

The boxes are usually secured to the stud along one side only and extend outward laterally of the stud into the wall cavity. Such a mounting is adequate to resist any movement of the switch box due to the force applied to a single switch mounted therein, to operate same. However, if two or more switches must be mounted in the same box, the leverage action of the force required to operate the switch most distant from the point at which the box is attached to the stud, has a distorting effect on the box. Over a long period of time, the repeated application of this overbalancing force may cause the switch box to loosen up and tilt on its mounting stud.

Therefore, in the past, it has been the common practice to add additional braces between the studs, in order to provide proper support for multi-gang switch boxes. The provision of such additional bracing is expensive, since each installation of a multi-gang box requires the special cutting and fitting of the braces, with resultant increase in labor costs, if local practice requires this to be done by different workmen.

The primary object of this invention, therefore, is to provide a multi-gang switch box that can be mounted between two normally spaced studs in a wall frame, without requiring supplementary bracing.

Another object is to provide such a box that can be mounted between two studs that vary somewhat from the normal in their spacing.

A further object is to provide a switch box of the type stated having a demountable hanger arm that can be adapted to accommodate studs of any spacing.

Another object is to provide a structure of the type stated whose assembled hanger arm is automatically locked in place against unintentional removal, thereby facilitating the installation of the boxes.

Other objects are to provide a device that is rugged in construction, relatively inexpensive to manufacture and easy to mount.

These and other objects of the invention will become apparent from a reading of the following specification and claims, together with the accompanying drawing, wherein like parts are referred to and indicated by like reference numerals, and wherein:

Figure 1:
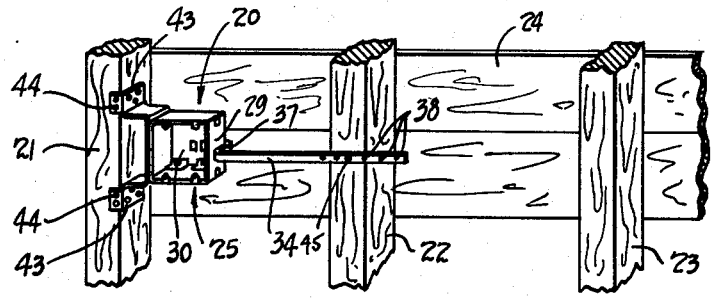
Figure 1 is a perspective view of the two-gang switch box that is the subject of this invention, as it appears mounted between two wall studs.

Referring more particularly to the drawing, there is seen in Figure 1 the switch box assembly that is the subject of this invention, broadly indicated by reference numeral 20, as it appears mounted between two wall studs 21 and 22.

The wall illustrated comprises a frame made up of spaced wooden studs 21, 22 and 23, faced with boards 24, or other suitable sheet material.

The switch box assembly 20 comprises a sheet metal case 25 and a hanger bar 34. The case 25 is formed in the usual manner with top, bottom, side and rear walls, 26, 27, 28, 29 and 30, respectively.

The case 25 has the usual clamps 39 for anchoring the electric cables therein, a hole 40 for the entrance of the cables, and suitable switch supporting ears 41.

In the form illustrated, the case is intended to hold two switches of the toggle type, not shown, but it is to be understood that the case may be widened to hold any number of switches in horizontal alignment.

Reference numeral 42 indicates a U-shaped bracket formed integral with the first side wall 28. The bracket 42 is intended for attachment to stud 21 by means of wood screws which pass through holes 44 in the terminal ears 43 of bracket 42, as seen in Figure 1.

The rear wall 30 of the case 25 has a socket element 31 struck outwardly from the rear face thereof, closed toward the first side wall 28 and faced toward and open to the second side wall 29.

Figure 2:
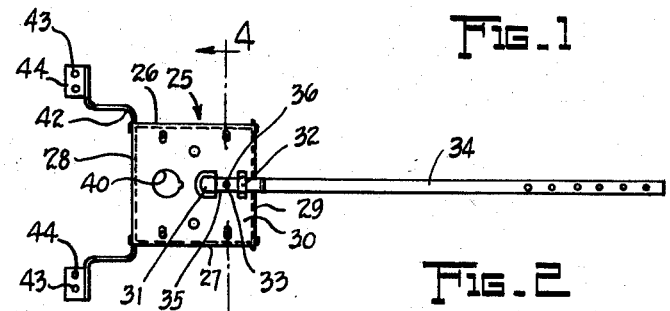
Figure 2 is a rear elevation of the assembled switch-box in its unmounted condition.
Figure 3:
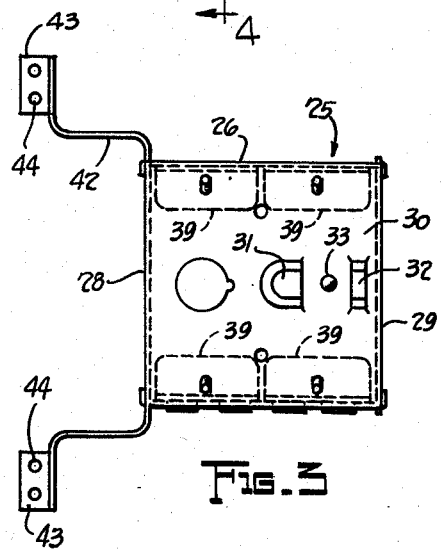
Figure 3 is an enlarged rear elevation of the same with its hanger arm removed.

A support strap 32 is also struck outwardly from the rear wall 30 between the socket 31 and the side wall 29. The strap is aligned horizontally with the open end of the socket 31, as is seen most clearly in Figures 2 and 3.

Figure 4:
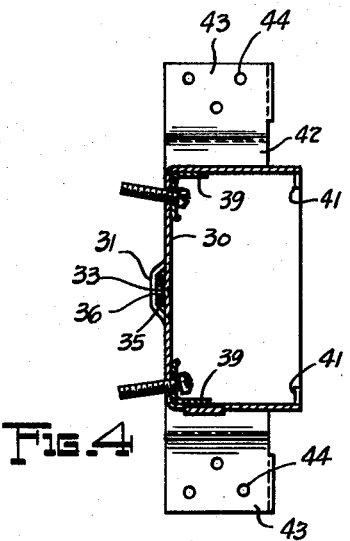
Figure 4 is a vertical sectional view taken along the line and in the direction of the arrows 4—4 of Figure 1.
Figure 5:
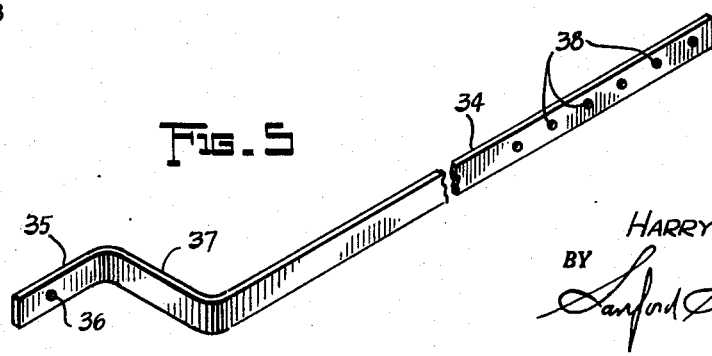
Figure 5 is a perspective view of the unmounted hanger arm.

Reference numeral 33 indicates a lock pin positioned on the rear wall 30 between the socket 31 and the strap 32. The lock pin 33 may be a separate piece, but is preferably formed by upsetting, in which case it is formed integral with the rear wall 30, as is seen most clearly in Figures 3 and 4.

Reference numeral 34 indicates a hanger bar having a terminal portion 35 and an offset portion 37. A plurality of spaced holes 38 are located at the extreme end of the bar.

A locking base or cavity 36 is located in the terminal end 35 of the hanger bar 34, so positioned that it will be in alignment with the lock pin 33 when the terminal end 35 of the hanger bar is seated in the socket 31.

The hanger bar 34 is attached to the case 25 by inserting the end 35 through the strap 32, over the lock pin 33 and into the socket 31. The end 35 of the hanger bar may be tilted slightly upward as it passes through the supporting strap 32, so that it will clear the top face of the lock pin 33. However, when the bar end 35 is fully inserted in the socket 31, the hole 36 is aligned with and receives the lock pin 33 therein, while at the same time the socket configuration holds the bar end 35 flat against the rear wall 30, as seen most clearly in Figure 4. The so engaged bar 34 is thus restrained from removal from the case 25 by the lock pin 33.

When the hanger bar 34 is so mounted the offset portion thereof 37, rests against the second side wall 29, parallel thereto. The hanger arm 34 then extends normal to the case wall 29 in a direction away from the bracket 42. The length of the arm 34 is such that its free end will overlay the face of the stud 22, as seen in Figure 1.

The hanger arm 34 is then attached to the stud 22 by screws 45 through one or more of the holes 38. By providing a plurality of holes 38, slight variations in the normal spacing of the studs will not prevent the arm from being attached thereto, since one of the holes 38 will be certain to come opposite the second stud 22.

The presence of the strap 32 in combination with the socket 31 provides a structure which holds the hanger bar 34 in rigid horizontal and perpendicular alignment with the case 25.

The combination of the lock pin 33 with a mating cavity or hole 36 in the hanger bar 34 provides a positive interlock between the assembled parts. The hanger bar cannot be accidentally disengaged from the socket 31 and fall off the case 25. This is a most important feature since the case 25 and the bar 34 may be packed more economically when disassembled, and then assembled on the job by the workman. Once assembled the interlock prevents separation of the case and bar which assures trouble free handling of the switch boxes 20 before mounting, since the workman does not have to worry about accidental separation of the parts. With the parts secure against accidental separation, more switch boxes can be handled in a single day, resulting in a substantial reduction in labor costs, since no time is lost in retrieving and reassembling dropped parts. If the interlocked hanger bar 34 must be removed from the case 25, for any reason, this may be done by simultaneously spring tilting the bar end 35 upward and pulling it outwardly of the socket 31. This intentional tilting and pulling will permit the cavity 36 to clear the top surface of the lock pin 33 so that the bar end 35 can ride across the pin 33.

The switch box assembly 20, once mounted between the two studs 21 and 22, as described hereinabove, provide a structure which holds the case 25 rigidly in place without requiring the presence of any supplementary wood braces or cleats between the studs.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:
1. In combination with two spaced wall studs, a multigang switch box, comprising a case member having top, bottom, side and rear walls, defining a switch supporting housing open to the front, one of said side walls having a stud engaging bracket formed integral therewith, the rear wall having a socket element struck from the face thereof, closed toward the first of said side walls and faced toward the second of said side walls, a support strap struck from the rear wall between the socket and the second side wall in alignment with the socket, a lock pin positioned on the rear wall betwen the socket and strap, and a hanger bar mounted in the socket over the locking pin and through the support strap, having a cavity therein to receive the pin in interlocked engagement when so seated in the socket, to restrain the bar against removal therefrom, the support bar being offset at its socket engaging end toward the front of the case, parallel to the second side wall thereof, and then extended normal to said side wall to lie across the face of a second stud spaced from the first stud, the stud engaging end of said bar having a plurality of spaced holes therethrough, and screws seated in said holes for anchoring the bar to said stud, whereby the case is supported between the two studs by its stud engaging bracket and hanger bar.

2. In combination with two spaced wall studs, a multigang switch box, comprising, a case member having top, bottom, side and rear walls, defining a switch supporting housing open to the front, one of said side walls having a stud engaging bracket formed integral therewith, the rear wall having a socket element struck from the face thereof, closed toward the first of said side walls and faced toward the second of said side walls, a support strap struck from the rear wall between the socket and the second side wall in alignment with the socket, a lock pin upset from said rear wall between the socket and strap, and a hanger bar mounted in the socket over the lock pin and through the support strap, having a cavity therein to receive the pin in interlocked engagement when so seated in the socket, to restrain the bar against removal therefrom, the support bar being offset at its socket engaging end toward the front of the case, parallel to the second side wall thereof, and then extended normal to said side wall to lie across the face of a second stud spaced from the first stud, the stud engaging end of said bar having a plurality of spaced holes therethrough, and screws seated in said holes for anchoring the bar to said stud, whereby the case is supported between the two studs by its stud engaging bracket and hanger bar.

References Cited in the file of this patent
UNITED STATES PATENTS

| | | |
|---|---|---|
| 1,592,990 | Raquette et al. | July 20, 1926 |
| 1,963,951 | Bowers | June 26, 1934 |
| 2,670,915 | Clark | Mar. 2, 1954 |
| 2,684,220 | Beber et al. | July 20, 1954 |